(12) United States Patent
Okada et al.

(10) Patent No.: US 6,344,086 B1
(45) Date of Patent: Feb. 5, 2002

(54) EXTRUSION COATING APPARATUS

(75) Inventors: Takehiko Okada; Shigeru Suemori; Yasushi Ito, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/233,097

(22) Filed: Jan. 19, 1999

(30) Foreign Application Priority Data

Jan. 19, 1998 (JP) ............................................. 10-007527

(51) Int. Cl.$^7$ ................................................. B05C 3/02
(52) U.S. Cl. ............................... 118/125; 118/DIG. 18; 118/420
(58) Field of Search ...................... 118/420, DIG. 18, 118/125, 410; 425/113

(56) References Cited

U.S. PATENT DOCUMENTS

| | | | |
|---|---|---|---|
| 3,692,447 A | 9/1972 | Nelson | 425/113 |
| 3,849,051 A | 11/1974 | Solbeck | 425/376 |
| 4,548,567 A | 10/1985 | Missout | 425/113 |

FOREIGN PATENT DOCUMENTS

| | | |
|---|---|---|
| GB | 1 591 317 | 6/1981 |
| GB | 0 849 065 | 6/1998 |
| JP | 61-179408 | 8/1986 |
| JP | 1-101211 | 9/1989 |
| JP | 4-1882 | 1/1992 |
| JP | 4-22617 | 1/1992 |

OTHER PUBLICATIONS

Patent Abstracts Of Japan, vol. 095, No. 003, Apr. 28, 1995 & JP 06 346993 A (ISHIKAWAJIMA HARIMA HEAVY IND CO LTD), Dec. 20, 1994 *abstract*.

*Primary Examiner*—Brenda A. Lamb
(74) *Attorney, Agent, or Firm*—McDermott, Will & Emery

(57) ABSTRACT

The present invention relates to an extrusion coating apparatus having a structure which is capable of correctly forming and applying a coating layer with a desirable cross-sectional form even when thermal distortion occurs in its extrusion unit. This extrusion coating apparatus comprises an extrusion unit extruding a thermoplastic resin while heating the resin, a coating unit providing a coating layer of the thermoplastic resin from the extrusion unit around a linear body pulled at a predetermined tension, and various distortion-absorbing structures absorbing the distortion in the extrusion unit caused by heating the thermoplastic resin.

3 Claims, 5 Drawing Sheets

Fig.1
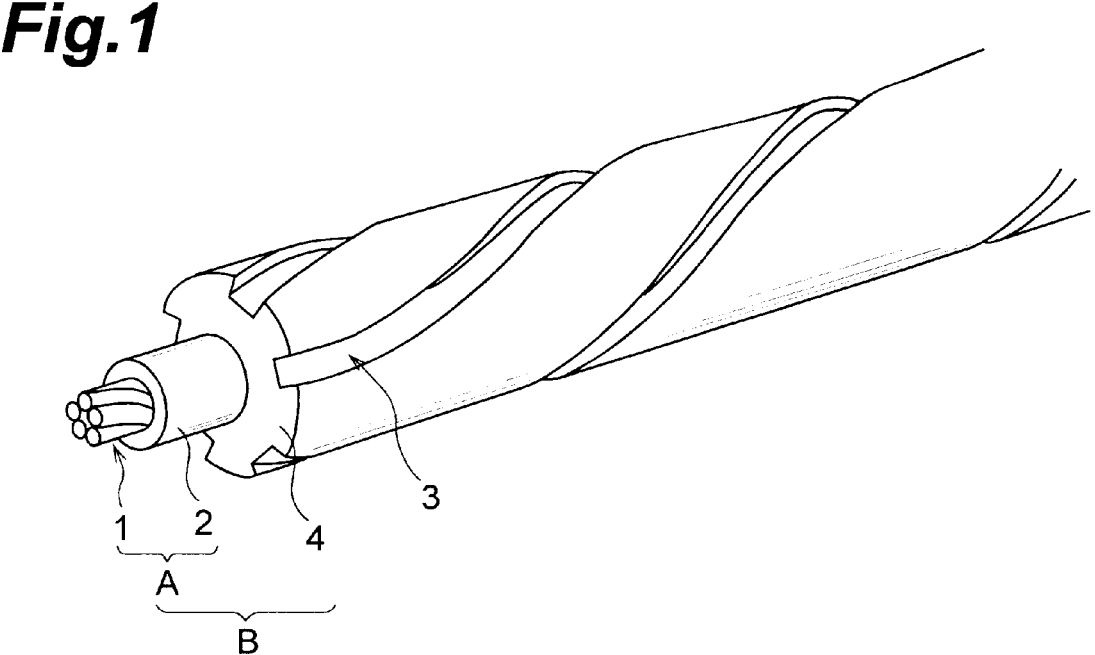
Fig.2
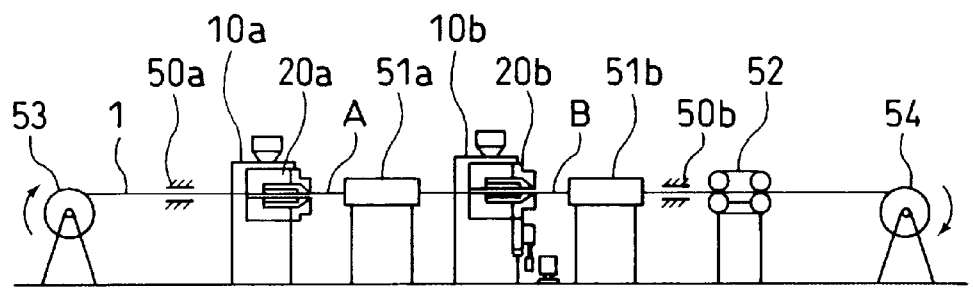
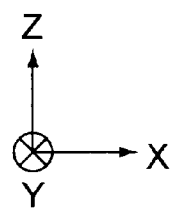

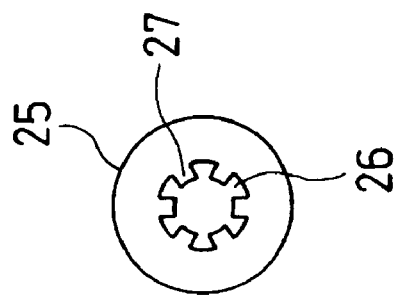
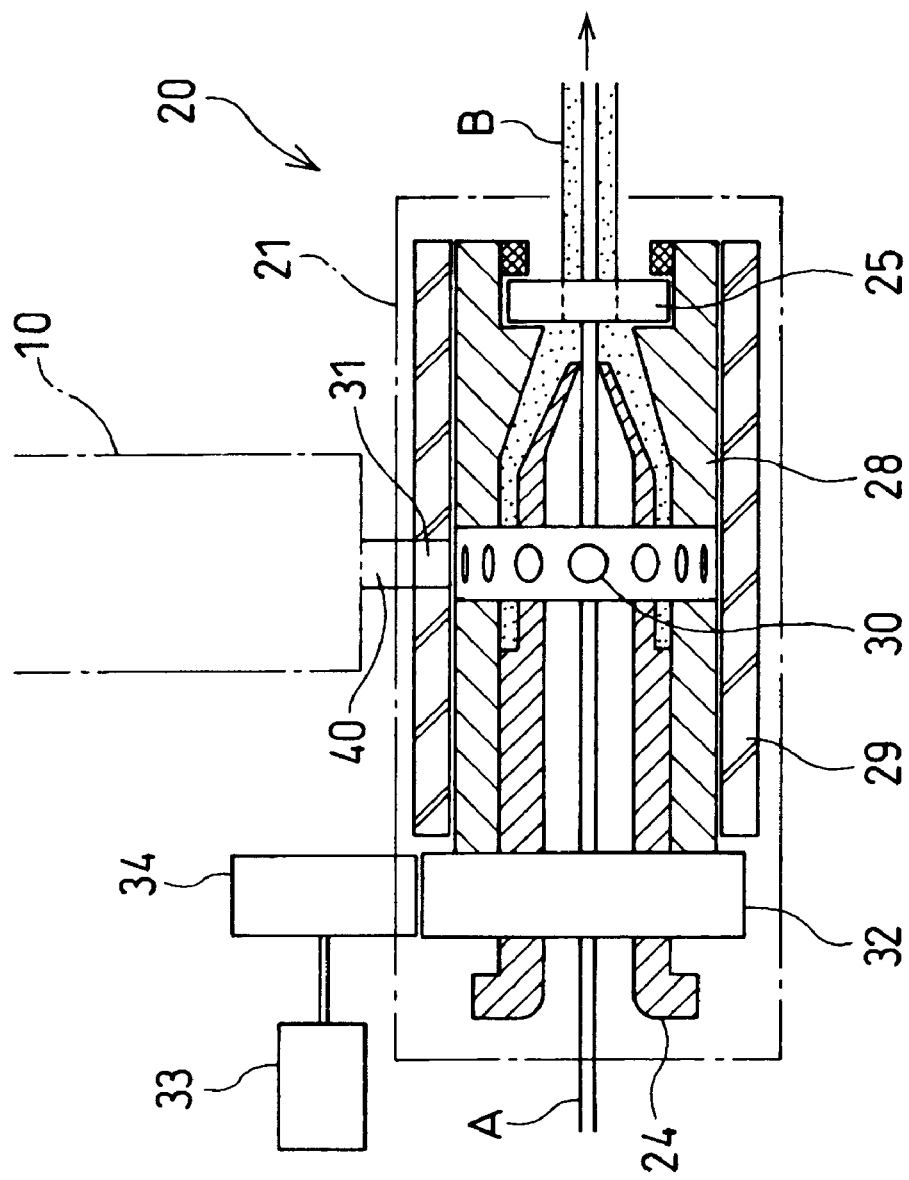

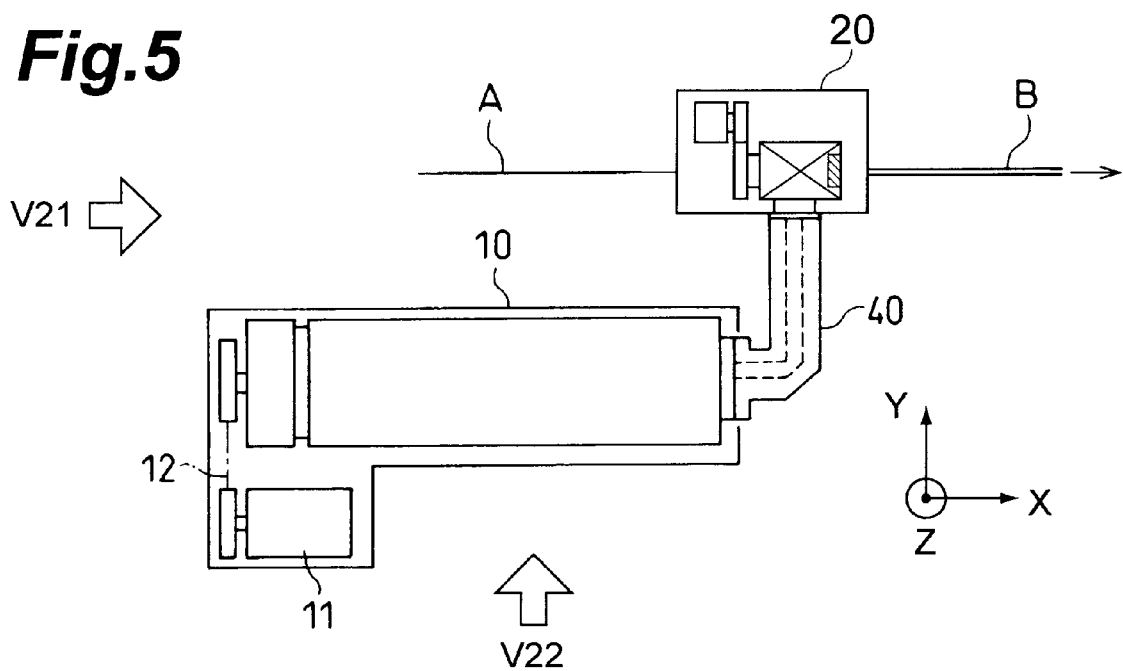

EXTRUSION COATING APPARATUS

BACKGROUND OF THE INVENTION

1. Field of the Invention

The present invention relates to an apparatus for applying a coating layer of a thermoplastic resin on the outer periphery of a linear body; and, in particular, to a structure of the apparatus capable of precisely producing a cross-sectional form of the coating layer.

2. Related Background Art

FIG. 1 is a sectional view of a slotted rod. This slotted rod B comprises a rod core A, which is constituted by a tension member 1 disposed at its center and a primary coating layer 2 disposed on the outer periphery of the tension member, and a coating layer 4 (spacer) disposed on the outer periphery of the rod core A. The surface of the coating layer 4 is provided with slots 3 (grooves for accommodating optical fibers) spirally extending along the longitudinal direction of slotted rod B. An optical cable in which an optical fiber ribbon (including a plurality of optical fibers) is inserted in each slot 3 has excellent characteristics in that it can attain higher density in containing fibers, workability would improve since connection can be made ribbon by ribbon, and so forth. In order for each of the optical fiber ribbons to maintain its transmission characteristics, the slotted rod B is required to be made with high accuracy. Therefore, for example, Japanese Utility Model Application Laid-Open No. 10-101211 or Japanese Patent Application Laid-Open No. 61-179408 discloses a method of making a slotted rod by a resin extrusion coating apparatus.

FIG. 2 is a schematic view showing a configuration of such a conventional extrusion coating apparatus for making a linear body having a coating layer such as slotted rod B. In this drawing, the tension member 1 paid out from a drum 53 is guided via a guiding device 50a to a first coating unit 20a attached to the front end portion of a first extrusion unit 10a, where the primary coating 2 made of adhesive polyethylene is applied thereto, thereby the rod core A having a circular cross section is formed.

As the rod core A is passed through a cooling bath 51a, the primary coating 2 is cured. Thereafter, the rod core A passed through the cooling bath 51a is sent to a second coating unit 20b attached to a second extrusion unit 10b, where the spacer 4 having the spiral slots 3 therearound is applied thereto, thereby the slotted rod B is obtained. Thus obtained slotted rod B is further introduced into a cooling bath 51b so as to be cooled and solidified and then is wound up around a take-up drum 54 by way of a guiding device 50b and a capstan 52.

SUMMARY OF THE INVENTION

Having studied the conventional extrusion coating apparatus, the inventors have found the following problems. Namely, in the conventional extrusion coating apparatus, the tension member 1 or rod core A is set by the guiding devices 50a, 50b such as to run at a predetermined position constantly. On the other hand, the first coating unit 20a and the second coating unit 20b are fixed at the front end portions of their corresponding extrusion units 10a and 10b, respectively. As a consequence, if the front end portion of the extrusion unit 10a, 10b moves upon thermal expansion to a direction (Y-axis direction) orthogonal to the drawing surface, the disposed position of the first or second coating unit 20a, 20b will fluctuate, thereby the relative positions of the first coating unit 20a and tension member 1 or the relative positions of the second coating unit 20b and rod core A will change with respect to each other. Hence, in thus obtained rod core A, the tension member 1 may become eccentric with respect to the center of the primary coating 2, or the rod core A may become eccentric with respect to the center of the spacer 4. When the rod core A becomes eccentric excessively with respect to the center of the spacer 4, bumps and dips may be generated at the bottom of the spiral slots 3 because of loss of resin at the bottom of the spiral slots 3, thereby problems may occur in that the optical fiber ribbons inserted in the slots 3 are damaged by the bumps and dips.

Also, since each coating unit is fixed at the front end portion of its corresponding extrusion unit in the conventional extrusion coating apparatus, there have been problems in that the vibration of the coating unit would increase when a die therein is rotated at a high speed in one direction or alternately in opposite directions, and so forth.

Therefore, it is an object of the present invention to provide an extrusion coating apparatus having a structure which is adapted to overcome the above-mentioned problems, thereby being capable of forming and applying a coating layer with a predetermined cross-sectional form onto the outer periphery of a linear body, such as a tension member and a rod core, as a target linear body, at a high speed even when thermal distortion occurs in its extrusion unit.

The extrusion coating apparatus according to the present invention comprises, at least, an extrusion unit extruding a thermoplastic resin while heating the resin, and a coating unit applying the extruded resin on the outer periphery of a linear body in a predetermined form while the linear body is passing therethrough. The extrusion unit and coating unit are connected to each other with a connecting tube guiding the heated thermoplastic resin from the extrusion unit to the coating unit. The connecting tube has a first opening connected to a resin inlet of the coating unit; and a second opening, opposing to the first opening, connected to a resin-extruding orifice of the extrusion unit.

In order to achieve the above-mentioned object, the extrusion coating apparatus according to the present invention further comprises a distortion-absorbing structure absorbing the distortion generated in the extrusion unit upon heating the thermoplastic resin.

For example, the distortion-absorbing structure can be realized by a rail extending along a predetermined direction with respect to the coating unit, and a pedestal movable on the rail in a state carrying the extrusion unit.

Thus, the coating unit is fixedly installed on a horizontal basis (corresponding to an installation floor surface), whereas the extrusion unit is movably disposed on the horizontal basis (by the distortion-absorbing structure). As a consequence, even when the extrusion unit is heated and thereby thermal distortion occurs to cause a positional fluctuation of the extrusion unit, the relative positional relationship between the coating unit and the linear body running therethrough would not change. Since the relative positions of the linear body and the coating unit with respect to each other are thus always kept constant, a coating layer having a predetermined form can be applied to the linear body without unevenness. Also, the vibration can be minimized in a coating unit having a rotator.

The installed positions of the extrusion unit and coating unit may have various modes. For example, the extrusion unit may be disposed such that the pass-line direction of the linear body and the direction of the heated thermoplastic resin extrusion are orthogonal to each other. Preferably, in this case, the connecting tube has such a form that straightly extends from the first opening toward the second opening while having a side face continuous from the first opening to the second opening.

In thus configured extrusion coating apparatus, even when the extrusion unit is heated and then this heat is conducted to the connecting tube to cause thermal expansion, the resulting thermal distortion is canceled as the extrusion unit moves about the coating unit. Therefore, the relative positions of the linear body and the coating unit are always kept constant with respect to each other, thereby a coating layer having a predetermined form can be applied to the linear body without unevenness. Also, since the main body of the extrusion unit and the coating unit have structures substantially identical to those of the conventional apparatus, they can be embodied easily.

The extrusion unit may also be disposed such that an angle formed between the pass-line direction of the pulled linear body and the extruded direction of the heated thermoplastic resin is not less than 0° and is less than 90°. In this case, the connecting tube has such a form that is bent at a predetermined location from the first opening toward the second opening while having a side face continuous from the first opening to the second opening.

In thus configured extrusion coating apparatus, when the extrusion unit is heated, this heat is conducted to the connecting tube. As a consequence, thermal distortions occur in the extrusion unit mainly along the extruding direction thereof, and in the L-shaped connecting tube along the extruding direction and the direction orthogonal thereto. These thermal distortions, however, are canceled as the extrusion unit moves about the coating unit with the aid of the connecting tube. As a consequence, the relative positions of the linear body and coating unit with respect to each other are always kept constant, thereby the coating layer having a predetermined form can be applied to the linear body without unevenness. Also, when the pass-line direction of the linear body and the extruding direction of the extrusion unit are disposed in parallel to each other, then a plurality of extrusion coating apparatus can be arranged close to each other, thereby the floor area can efficiently be used.

The distortion-absorbing structure can also be realized by changing the configuration of the connecting tube. Namely, the connecting tube may be provided with the distortion-absorbing structure which comprises a first flexible joint section including the first opening and a second flexible joint section including the second opening.

As a consequence, even when each of the coating unit and the extrusion unit is fixedly installed, they are connected to each other with the connecting tube having the distortion-absorbing structure, thereby the positional fluctuation of the extrusion unit caused by thermal distortion would not influence the relative positions of the linear body and the coating unit with respect to each other. Therefore, a coating layer having a preferable cross-sectional form can be formed on the outer periphery of the linear body.

In the case where the extrusion coating apparatus according to the present invention is employed as the apparatus for making a slotted rod such as that mentioned above, the extrusion coating apparatus can provide a primary coating layer around a tension member to form a rod core and then the spacer around a rod core. In this case, the coating unit includes a rotatable die having a through hole through which the linear body penetrates, the rotatable die having a protrusion extending from the inner wall of the through hole toward the center of the through hole. In this coating unit, as the rotatable die is rotated in a predetermined direction about the linear body or the rotating direction of the rotatable die is reversed every time the linear body travels a predetermined distance, a spiral slot is formed on the coating layer surface of the linear body. Here, the die in the coating unit is not necessarily be rotated about the linear body but may also be made stationary.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a view showing a sectional configuration of a slotted rod;

FIG. 2 is a view showing a configuration of a conventional extrusion coating apparatus;

FIGS. 3A to 3C are views showing a configuration of a first embodiment of the extrusion coating apparatus according to the present invention, in which FIG. 3A is an upper plan view of the extrusion coating apparatus according to the first embodiment, FIG. 3B is a side view of the extrusion coating apparatus according to the first embodiment as observed from the direction of arrow V11 in FIG. 3A, and FIG. 3C is a side view of the extrusion coating apparatus according to the first embodiment as observed from the direction of arrow V12 in FIG. 3A;

FIG. 4A is a sectional view showing an inner configuration of a coating unit having a rotatable die, whereas FIG. 4B is a plan view showing a configuration of the rotatable die;

FIG. 5 is an upper plan view showing a configuration of a second embodiment of the extrusion coating apparatus according to the present invention;

DETAILED DESCRIPTION OF THE PREFERRED EMBODIMENTS

In the following, embodiments of the extrusion coating apparatus according to the present invention will be explained in detail with reference to FIGS. 3A to 4B, 5, 6A, 6B, 7, and 8. In the explanation of the drawings, constituents identical to each other will be referred to with numerals identical to each other without repeating their overlapping descriptions.

In the following embodiments, the case where the extrusion coating apparatus according to the present invention is employed for making a slotted rod (see FIG. 1) will be explained. Though the extrusion coating apparatus, in the making of a slotted rod in particular, can form a primary coating layer on the outer periphery of a tension member and form a spacer on the outer periphery of a rod core, the structure for providing a spacer on the outer periphery of the rod core will mainly be explained in the following.

Figure 3A:
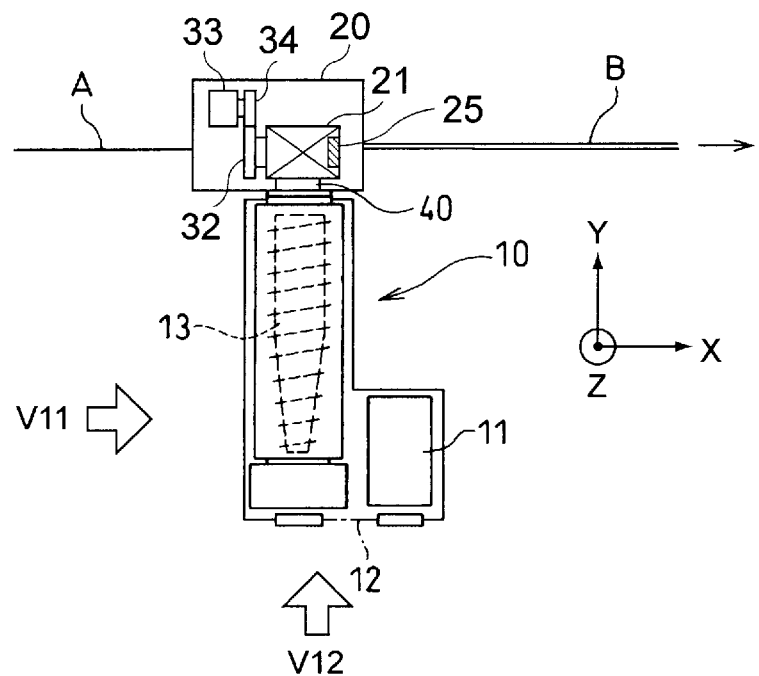
Figures 3B, 3C:
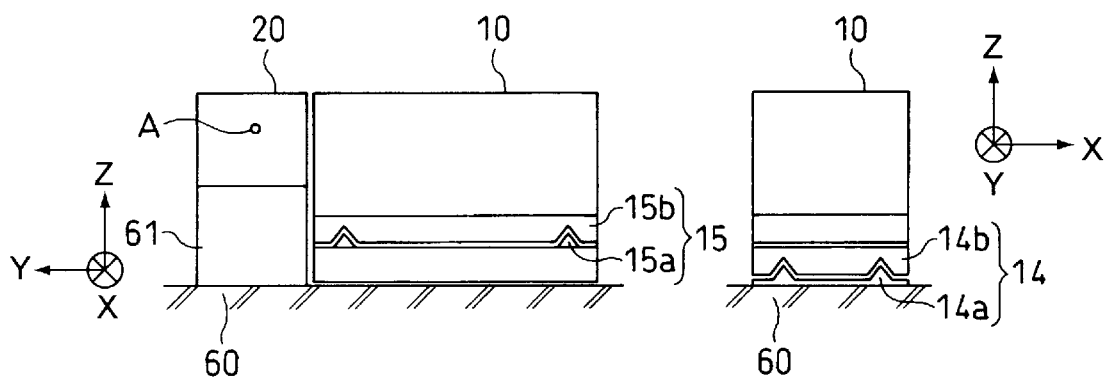

FIGS. 3A to 3C are views showing a configuration of the extrusion coating apparatus according to the first embodiment, in which FIG. 3A is an upper plan view of the extrusion coating apparatus according to the first embodiment, FIG. 3B is a side view of the extrusion coating apparatus as observed from the direction of arrow V11 in FIG. 3A, and FIG. 3C is a side view of the extrusion coating apparatus as observed from the direction of arrow V12 in FIG. 3A. This extrusion coating apparatus comprises an extrusion unit 10 and a coating unit 20. The extrusion unit 10 incorporates a screw 13 therein and kneads a thermoplastic resin while heating the same. The coating unit 20 introduces therein thus kneaded thermoplastic resin, and forms and applies a coating layer 4 (see FIG. 1) onto the outer periphery of a rod core A running therethrough. The coating layer 4 has spiral slots 3 which extend along the longitudinal direction of the rod core A, while reversing their directions at intervals of a predetermined pitch. The extrusion unit 10 and the coating unit 20 are connected each other with a connecting tube 40, and the kneaded thermoplastic resin travels through the connecting tube 40 from the extrusion unit 10 to the coating unit 20. The extruding direction Y of the extrusion unit 10 and the pass-line direction of the pulled rod core A are orthogonal to each other. The coating unit 20 is fixedly installed on an installation site 60 with the aid of a stationary table 61, whereas the extrusion unit 10 is movable by moving units 14 and 15 (included in an distortion-absorbing structure) disposed on the installation site 60.

The configurations of individual members will now be explained. In FIG. 3A, the rotation of a motor 11 is transmitted to the screw 13 via a transmission mechanism 12, and a not-illustrated heater is disposed on the outer periphery of the screw 13. In FIGS. 3B and 3C, the moving units 14 and 15 included in the distortion-absorbing structure are movable in Y and X directions, respectively, and are formed by fixedly disposed rails 14a, 15a and pedestals 14b, 15b movable on the rails 14a, 15a.

FIG. 4A is a sectional view showing an inner configuration of the coating unit 20, whereas FIG. 4B is a plan view of a rotatable die 25 attached to the coating unit 20. The coating unit 20 comprises a cross head 21 incorporating the rotatable die 25 therein, and a transmission mechanism 34 for transmitting the rotation of a motor 33 to the rotatable die 25. The cross head 21 comprises a cylindrical nipple 24, having a tapered front end, for passing the rod core A therethrough at the center axis thereof; the rotatable die 25; and a cylindrical rotatable frame 28 coaxially accommodating the cylindrical nipple 24 and the rotatable die 25 therein. The rotatable die 25 is a disk having a through hole 26 for defining a line outlet, and is provided with protrusions 27 extending toward the center of the disk. The rotatable frame 28 is slidably accommodated in a cylindrical stationary frame 29 such as to be concentric therewith. The central body portion of the cylindrical rotatable frame 28 is provided with a plurality of holes 30, arranged along its circumference, for passing the thermoplastic resin therethrough. The stationary frame 29 is provided with a plurality of through holes 31 at positions coinciding with the positions of the holes 30. The through holes 31 communicate with the extrusion unit 10 by way of the connecting tube 40. One end of the rotatable frame 28 is provided with a gear 32, to which the rotation of the motor 33 is transmitted via the transmission mechanism 34. The motor 33 rotates in one direction or alternate direction at a predetermined cycle.

A method of making the slotted rod B shown in FIG. 1 having spiral slots 3 on the surface of the spacer 4 will now be explained. The thermoplastic resin pushed out through the through holes 31 successively pass through the holes 30 and the gap between the inner peripheral face of the rotatable frame 28 and the outer peripheral face of the nipple 24, so as to be extruded to the hole 26 of the rotatable die 25. Since the rod core A that moves while being pulled is positioned at the center part of the rotatable die 25 at this time, the outer periphery of the rod core A is coated with the spacer 4 having the slots 3 defined by the form of the protrusions 27. As the rotatable die 25 is rotated by the motor 33, the slots 3 are formed spirally.

The operation in the case where thermal distortion is generated in the extrusion coating apparatus upon thermal expansion will now be explained. When the extrusion unit 10 is heated, then this heat is conducted to the connecting tube 40, thereby causing thermal distortion. The distortion stress occurring between the extrusion unit 10 and the coating unit 20 moves the extrusion unit 10 about the coating unit 20 in the direction opposite to the extruding direction Y, since the coating unit 20 is made stationary whereas the extrusion unit 10 is movable by the distortion-absorbing structure shown in FIGS. 3B and 3C. In the extrusion unit 10, thermal distortions in X direction occur symmetrically to each other with respect to the axis of the screw 13, and the thermal distortion in the vertical direction acts circumferentially with respect to the axis center of the rod core A, thereby they are negligible in practice. As a consequence, the position of the coating unit 20 is not influenced by the thermal distortions occurring in the extrusion unit 10, thereby the relative positions of the coating unit 20 and the rod core A with respect to each other are kept constant, and the coating layer 4 having a desirable cross-sectional form is always applied to a predetermined position.

FIG. 5 is a view showing a configuration of a second embodiment of the extrusion coating apparatus according to the present invention. Here, the lateral configuration observed from the direction of arrow V21 in FIG. 5 is similar to the configuration shown in FIG. 3B, whereas the lateral configuration observed from the direction of arrow V22 in FIG. 5 is similar to the configuration shown in FIG. 3C, thereby the second embodiment is provided with a distortion-absorbing structure similar to that of the first embodiment. In the second embodiment, the extruding direction Y of the extrusion unit 10 and the running direction of the rod core A are disposed in parallel to each other. Also, the extrusion unit 10 and the coating unit 20 are connected to each other with a connecting tube 40 which is bent into L shape.

The connecting tube 40 is bent into L shape, and the thermoplastic resin passes therethrough from the extrusion unit 10 to the coating unit 20. The extrusion unit 10, the moving units 14, 15 (included in the distortion-absorbing structure), the coating unit 20, and the stationary table 61 are identical to those of the first embodiment.

The case where the extrusion unit 10 and the connecting tube 40 are deformed upon thermal expansion will now be explained. In FIG. 5, when the extrusion unit 10 is heated, then the connecting tube 40 is also heated by thermal conduction, thereby the thermal distortion occurs in the extrusion unit 10 along Y direction, and in the connecting tube 40 along X direction. Hence, a distortion stress occurs between the extrusion unit 10 and the coating unit 20. The thermal distortion, however, is canceled as the extrusion unit 10 moves about the coating unit 20 in Y and X directions with the aid of the moving units 14, 15, since the extrusion unit 10 is movable by the distortion-absorbing structure whereas the coating unit 20 is stationary. Since the position of the coating unit 20 is unchanged, the relative positions of the coating unit 20 and the rod core A with respect to each other are kept constant, thereby the spacer 4 having a desirable cross-sectional form can always be applied on the outer periphery of the rod core A, and the rotatable die 25 of the coating unit 20 can be rotated at a high speed. Also, when the extrusion unit 10 is disposed in parallel to the pass-line of the rod core A, then a plurality of extrusion coating apparatus can be arranged close to each other, thereby the floor area can efficiently be used.

The foregoing explanations refer to the extrusion coating apparatus in the case where the spacer 4 having the spiral slots 3 is applied to the rod core A by using the rotatable die 25. Such an extrusion coating apparatus can apply a cylindrical coating layer to the rod core A if the rotatable die 25 is replaced by the stationary die shown in FIG. 6.

Figure 6:
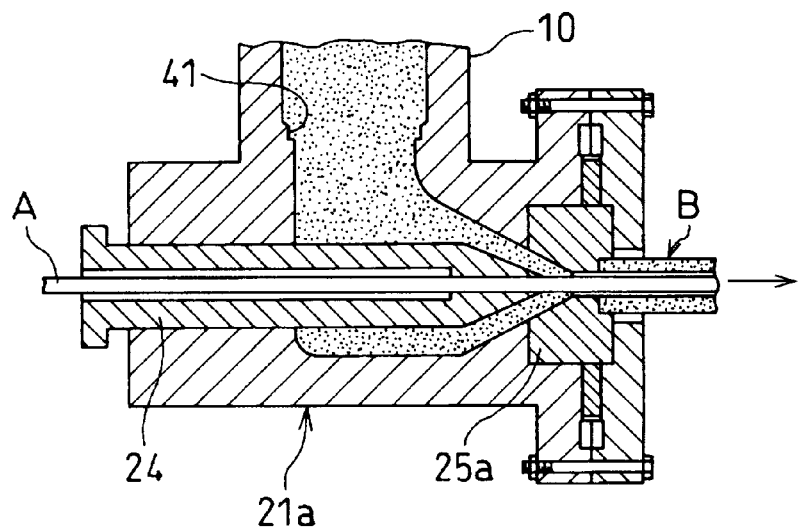
FIG. 6 is a sectional view showing an inner configuration of a coating unit having a stationary die.

FIG. 6 is a sectional view showing an inner configuration of a coating unit having a disk-shaped stationary die 25a having a hole at the center part thereof. In this coating unit, the stationary die 25a is made stationary on the center axis of a nipple 24 and is accommodated in a cross head 21a. The rod core A penetrates through the nipple 24 and passed through the hole center of the stationary die 25a. The thermoplastic resin pushed out of the extrusion unit 10 passes through the connecting tube 40, so as to be extruded through the stationary die 25a and further pass through the space between the hole of the stationary die 25a and the rod core A, thereby applying a coating, as a spacer, on the outer periphery of the rod core A.

Figure 7:
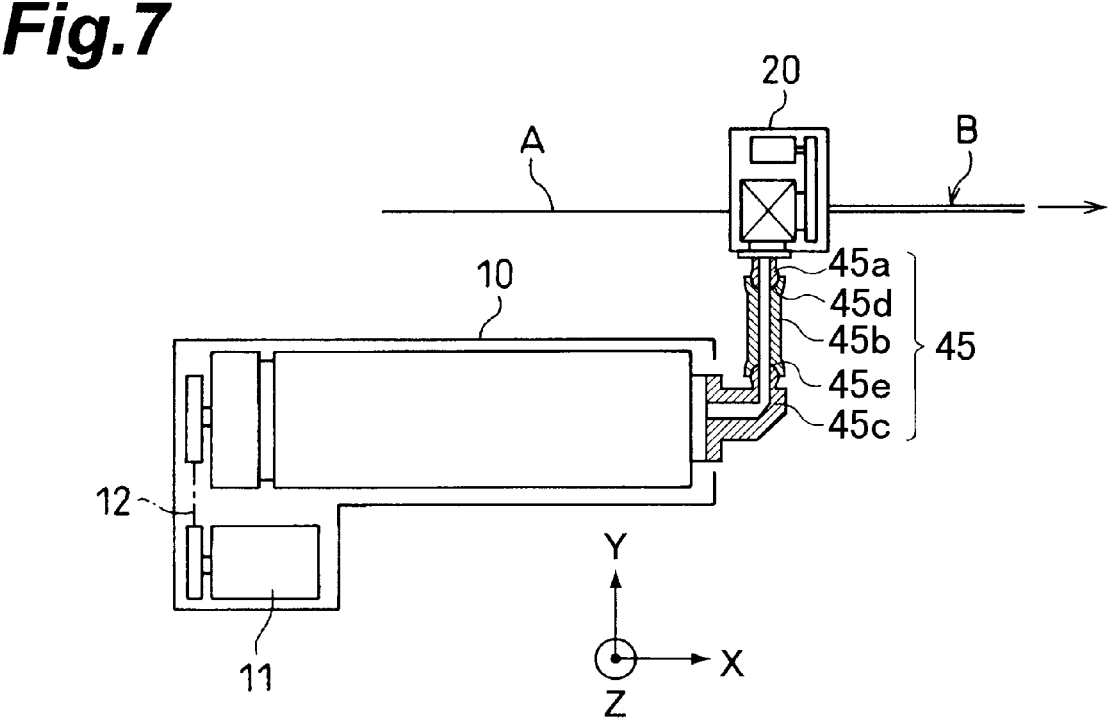
FIG. 7 is an upper plan view showing a configuration of a third embodiment of the extrusion coating apparatus according to the present invention.

FIG. 7 is a plan view showing a configuration of a third embodiment of the extrusion coating apparatus according to the present invention. The extrusion unit 10 is disposed such that its extruding direction Y is in parallel to the traveling direction of the rod core A penetrating through the coating unit 20, namely the pass-line of the linear body, whereas the extrusion unit 10 and the coating unit 20 are connected to each other with a connecting tube 45 for supplying a resin from the extrusion unit 10 to the coating unit 20 while bending the extruding direction of resin at 90°. Each of the extrusion unit 10 and the coating unit 20 is fixedly installed.

The connecting tube 45 is constituted by three tube parts 45a, 45b and 45c jointed to each other at two joint sections 45d and 45e. More specifically, at the joint sections 45d and 45e, a convex connection surface of one tube part is in contact with a concave connection surface of the other tube part, and thereby the tube parts adjacent to each other are jointed while an angle formed between their tube axes is changeable. As having the above-mentioned structure, the joint sections between the tube parts 45a and 45b and between the tube parts 45b and 45c would slide and bend so as to absorb the thermal distortion (as a distortion-absorbing structure) even when a slight thermal distortion is caused in the extrusion unit 10.

Since the extrusion coating apparatus according to the fourth embodiment utilizes the change in form of the connecting tube 45 having a small weight, it can absorb even a slight thermal distortion, thus being capable of always keeping the relative positions of the coating unit 20 and the rod core A constant with respect to each other. Also, since each of the extrusion unit 10 and the coating unit 20 is made stationary, the installation of the extrusion coating apparatus is stable.

In accordance with the present invention, as explained in the foregoing, since the extrusion unit is disposed such as to be movable in directions horizontal and vertical to the pass-line direction of the rod core, whereas the coating unit is made stationary, the coating unit would not move even when the extrusion unit is expanded upon heating. As a consequence, the relative positions of the linear body and the coating unit with respect to each other are always kept constant, thereby a coating layer having a desirable cross-sectional form can be formed and applied onto the outer periphery of the linear body.

Also, in a configuration in which the coating unit and the extrusion unit are made stationary independently of each other, while being connected to each other with a connecting tube comprising a distortion-absorbing structure, thermal distortion is absorbed by the connecting tube, thereby no positional fluctuation would occur in the coating unit. As a consequence, the relative positions of the linear body and the coating unit with respect to each other are always kept constant, thereby a coating layer having a desirable cross-sectional form can be formed and applied onto the outer periphery of the linear body.

Further, when a connecting tube having such a structure that both ends thereof can be twisted in directions opposite to each other about the tube axis is provided, the position of the line outlet in the coating unit is made rotatable about the axis of the connecting tube. As a consequence, the line outlet of the coating unit can be tilted in response to the deflecting direction of the linear body, thereby a coating layer without eccentricity can be formed on the outer periphery of the linear body.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An extrusion coating apparatus comprising:

an extrusion unit for extruding a thermoplastic resin while heating said resin;

a coating unit provided at a predetermined position so that a linear body pulled at a predetermined tension penetrates therethrough, thereby applying a coating layer of said thermoplastic resin around said linear body;

a connecting tube having a first opening connected to a resin inlet of said coating unit, and a second opening opposing said first opening and being connected to a resin-extruding orifice of said extrusion unit; and a distortion-absorbing structure for absorbing a distortion in said extrusion unit caused by heating said thermoplastic resin, said distortion-absorbing structure including a structure for making said extrusion unit movable with respect to said coating unit, wherein said distortion-absorbing structure includes a structure for making said extrusion unit movable with respect to said coating unit, wherein said extrusion unit is provided such that an angle formed between a pass-line direction of said linear body and an extruded direction of said heated thermoplastic resin is not less than 0° but less than 90°, and wherein said connecting tube has such a form that is bent at a predetermined portion thereof from said first opening toward said second opening.

2. An apparatus according to claim 1, wherein said structure for making said extrusion unit movable with respect to said coating unit includes a rail extending along a predetermined direction with respect to said coating unit and a pedestal movable on said rail in a state carrying said extrusion unit.

3. An apparatus according to claim 1, wherein said coating unit has a rotatable die having a through hole through which said linear body penetrates, said rotatable die having one or more protrusions extending from an inner wall defining said through hole toward a center of said through hole.

* * * * *